US011923750B2

(12) United States Patent
Mikkelsen et al.

(10) Patent No.: US 11,923,750 B2
(45) Date of Patent: Mar. 5, 2024

(54) THREE-PHASE STATOR ASSEMBLY

(71) Applicant: GRUNDFOS HOLDING A/S, Bjerringbro (DK)

(72) Inventors: Steen Mikkelsen, Bjerringbro (DK); Keld Folsach Rasmussen, Ans (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 176 days.

(21) Appl. No.: 17/551,540

(22) Filed: Dec. 15, 2021

(65) Prior Publication Data

US 2022/0200397 A1 Jun. 23, 2022

(30) Foreign Application Priority Data

Dec. 18, 2020 (EP) ..................... 20215323

(51) Int. Cl.
*H02K 1/14* (2006.01)
*H02K 3/28* (2006.01)
(Continued)

(52) U.S. Cl.
CPC ............. *H02K 5/225* (2013.01); *H02K 1/148* (2013.01); *H02K 3/28* (2013.01); *H02K 3/522* (2013.01); *H02K 2203/06* (2013.01)

(58) Field of Classification Search
CPC .......... H02K 1/148; H02K 3/32; H02K 3/325; H02K 3/52; H02K 3/521; H02K 3/522; H02K 2203/06; H02K 3/28
See application file for complete search history.

(56) References Cited

U.S. PATENT DOCUMENTS 5,029,379 A * 7/1991 Niemela ............. H02K 15/095
310/71
2005/0212377 A1 9/2005 Wang et al.
(Continued)

FOREIGN PATENT DOCUMENTS

CN 107546900 A 1/2018
CN 110690769 A 1/2020
(Continued)

OTHER PUBLICATIONS

Yoshimura, Machine Translation of JP2011244627, (Year: 2011).*

*Primary Examiner* — Eric Johnson
(74) *Attorney, Agent, or Firm* — McGlew and Tuttle, P.C.

(57) ABSTRACT

An electric pump drive motor three-phase stator assembly (1) includes three sets of stator segments ($S_{i,j}$), configured in a ring about a stator axis (R). Each set includes n≥2 stator segments arranged in an n-fold rotational symmetry about the stator axis. Each stator segment includes a coil (3) having a first coil wire end and a second coil wire end. A plurality of 3n−3 connection wires ($W_{i,k}$) connect coils of a respective set of stator segments in series. A first and a second interposed stator segment are arranged in circumferential direction between the two connected coils of the respective set of stator segments. 3n−5 of the connection wires span across the first interposed stator segment at a distance ($r_1$) to the stator axis and across the second interposed stator segment at a second distance ($r_2$) to the stator axis (R). The second distance is larger than the first distance.

17 Claims, 11 Drawing Sheets

(51) Int. Cl.
  *H02K 3/52*  (2006.01)
  *H02K 5/22*  (2006.01)

(56) References Cited

U.S. PATENT DOCUMENTS

| | | | | |
|---|---|---|---|---|
| 2007/0114877 A1* | 5/2007 | Wang | ................. | H02K 3/522 |
| | | | | 310/180 |
| 2007/0182265 A1 | 8/2007 | Makino et al. | | |
| 2007/0232094 A1 | 10/2007 | Hoshika | | |
| 2011/0215660 A1* | 9/2011 | Goto | ................. | H02K 5/203 |
| | | | | 310/53 |
| 2015/0162793 A1* | 6/2015 | Hashimoto | ............ | H02K 3/522 |
| | | | | 310/208 |

FOREIGN PATENT DOCUMENTS

| | | | |
|---|---|---|---|
| CN | 111386651 A | | 7/2020 |
| CN | 111668961 A | | 9/2020 |
| DE | 10328720 A1 | | 1/2005 |
| DE | 102016115455 A1 | | 2/2018 |
| EP | 0064105 A1 | | 11/1982 |
| EP | 3493375 A1 | | 6/2019 |
| JP | 2011244627 A | * | 12/2011 |
| JP | 2014113047 A | | 6/2014 |
| WO | 2011108735 A1 | | 9/2011 |
| WO | 2019168360 A1 | | 9/2019 |

* cited by examiner

THREE-PHASE STATOR ASSEMBLY

CROSS REFERENCE TO RELATED APPLICATIONS

The This application claims the benefit of priority under 35 U.S.C. § 119 of European Application 20215323.5, filed Dec. 18, 2020, the entire contents of which are incorporated herein by reference.

TECHNICAL FIELD

The present disclosure refers to a three-phase stator assembly of an electric pump drive motor. Such a three-phase stator assembly may be in particular used in a permanent magnet synchronous motor (PMSM) of a pump assembly.

TECHNICAL BACKGROUND

It is known to use stator assemblies comprising a plurality of stator segments in electric motors. For example, US 2007/0232094 A1, WO 2011/108735 A1 or US 2007/0182265 A1 describe such stator assemblies.

However, it is a technical challenge to electrically connect the stator segments to each other as needed in an efficient and safe way. Installing and connecting coil wires as known from the prior art often requires manual work and is thus prone to human error and quality issues. Furthermore, connection wires of the prior art are often longer than needed and consume unnecessary space and material.

SUMMARY

It is therefore an object of the present disclosure to provide a three-phase stator assembly that can be assembled more automatically by a machine with none or less manual work and which consumes less space and material.

Therefore, the present disclosure provides a three-phase stator assembly according to claim 1. Preferred embodiments of the three-phase stator assembly may be derived from the subclaims, the description and the figures.

The three-phase stator assembly as disclosed herein is specifically applicable for an electric pump drive motor, e.g. a permanent magnet synchronous motor (PMSM). The stator assembly comprises:

three sets of stator segments, wherein the stator segments are arranged in a ring arrangement about an axially extending stator axis, wherein each set of stator segments comprises n≥2 stator segments being arranged in an n-fold rotational symmetry about the stator axis, wherein each stator segment comprises a coil having a first coil wire end and a second coil wire end, and a plurality of 3n−3 connection wires arranged at the axial front side of the stator segments, wherein each connection wire connects two coils of a respective set of stator segment in series, wherein a first interposed stator segment and a second interposed stator segment of the other two sets of stator segments are arranged in circumferential direction between the two connected coils of said respective set of stator segments.

At least 3n−5 of the connection wires span across the first interposed stator segment at a first radial distance to the stator axis and across the second interposed stator segment at a second radial distance to the stator axis, wherein the second radial distance is larger than the first radial distance.

So, it is important to understand that the connection wires do not simply follow a circular path concentric to the stator axis in order to connect two coils of a set of stator segments in series. Each connection wire spans across two interposed stator segments of the other two sets that are placed in between, i.e. the first interposed stator segment and the second interposed stator segment. By increasing the radial distance of the connection wire on its path from the first stator segment to the second stator segment, the connection wire is able to take a very short path and can be designed to be relatively short and easy to assemble. It is also important to note that there is no coil wire that extends over two or more stator segments. So, there is a need for a connection wire to connect the coil wires of a set of stator segments.

The stator assembly comprises a total number of 3n stator segments, arranged in three sets of n stator segments. Herein, i shall be an index for the set, i.e. $i=\{1, 2, 3\}$. Furthermore, j shall be an index for the stator segment within a set, i.e. $j=\{1, \ldots, n\}$. Thereby, a specific stator segment may be denoted as $S_{i,j}$, which means the $j^{th}$ stator segment in the $i^{th}$ set. The stator assembly comprises at least a total number of 3n−3 connection wires, of which n−1 connection wires are attributed to each set of stator segments. Therefore, k shall be an index for the connection wire for a set, i.e. $k=\{1, \ldots, n-1\}$, so that a specific connection wire may be denoted as $W_{i,k}$, which means the $k^{th}$ connection wire in the $i^{th}$ set. Preferably, the stator segments are completely separate units before they are arranged in a ring arrangement to form the stator assembly in the manufacturing and assembly process. Preferably, the coil wires of a set of stator segments are connected to each other by the connection wires after the stator segments are arranged in a ring arrangement to form the stator assembly in the manufacturing and assembly process.

Optionally, the at least 3n−5 of the connection wires may have the same or essentially the same shape and length. This facilitates automation and the complexity a lot. It should be noted that the first (i=1, k=1) and last (i=3, k=n−1) of the total number of 3n−3 connection wires may principally have a different shape and/or length, but have preferably also the same shape and length as the other 3n−5 of the connection wires, so that preferably all of the 3n−3 have the same shape and length.

Optionally, all connection wires may extend along their full length essentially in a common plane perpendicular to the stator axis. This is a very space-saving arrangement and also advantageous for automatically assembling the connection wires by a machine, because there is no crossing or lifting of connection wires needed.

Optionally, the three-phase stator assembly may further comprise a star point wire, wherein the star point wire connects the first coil wire ends of the coil of the $(j=n)^{th}$ stator segments of the three sets of stator segments with each other. When the stator segments of a set of stator segments are connected in series to each other, the last (j=n) stator segment of each set of stator segment may be connected to the star point wire.

Optionally, the three-phase stator assembly may further comprise a three-phase power input line with three phases, wherein each phase is connected to a second coil wire end of the coil of the first (j=1) stator segment of a respective set of stator segments. So, the first stator segment of each set of stator segments is connected to one of the three phases of the three-phase power input line. Preferably, the second coil wire ends of the coils of the stator segments are arranged at a radially outer side of the stator segment, whereas the first coil wire end is preferably arranged at a radially inner side of the stator segment.

Optionally, all stator segments are identical to each other in order to facilitate the automation process and to reduce the diversity of parts. Optionally, the three-phase stator assembly may further comprise a wire guide element arranged at the axial front side of the stator segments, wherein the wire guide element defines a plurality of wire paths, wherein the wire paths are arranged in a 3n-fold rotational symmetry about the stator axis. Thereby, the wire paths are identical across all stator segments, which provides an exact 3n-fold rotational symmetry of the three-phase stator assembly before assembling the connection wires. This is very beneficial for an efficient automation of the assembling process.

Optionally, the wire guide element is comprised of a plurality of 3n separate and identical wire guide structures, wherein each wire guide structure is arranged at an axial front side of a respective stator segment. Thereby, each wire guide structure may be part of the stator segment before the stator segments are assembled to form the ring arrangement for the stator assembly. Alternatively, one or more of the wire guide structures may be connected to each other and mounted to the axial front side of the three-phase stator assembly after the stator segments are assembled to form the ring arrangement of the stator assembly. The wire guide structures may all be connected to form an integral annular wire guide element that is mounted to the axial front side of the axial front side after formation of the stator segments to the ring arrangement.

Optionally, the wire guide structures have a distance to each other in circumferential direction. Such a distance may be beneficial for a connection wire to "switch" to a more radially outward wire path between neighbouring wire guide structures.

Optionally, the wire guide element may be fixed to the axial front side of the stator segments by a positive fit. For instance, it may be clicked into a snap-in mechanism provided at the axial front side of each stator segment.

Optionally, the wire guide element may be arranged radially between the first coil wire end and the second coil wire end of the coil of a respective stator segment.

Optionally, the first coil wire end of the coil of each stator segment may be arranged at a first lateral side of the respective stator element and the second coil wire end of the coil of each stator segment may be arranged at a second lateral side of the respective stator segment. The connection wires may connect the first coil wire end of the coil of a stator segment of a set of stator segments with the second coil wire end of the coil of the next-in-series stator segment of said set of stator segments. Thereby, arranging the coil wire ends at different lateral sides of the stator segment is beneficial to reduce the length of the connection wires.

Optionally, each stator segments may further comprise a first insulation displacement terminal for connecting the connection wires with the first coil wire end and a second insulation displacement terminal for connecting the connection wire with the second coil wire end. Such insulation displacement terminals are also advantageous to facilitate the automation process. The insulation displacement terminals cut transversely through an insulation coating of the respective wire in order to both establish an electric connection with the wire and to mechanically fix the wire.

Optionally, the first insulation displacement terminal is axially inserted into a first slot defined at the axial front side of the stator segment and the second insulation displacement terminal is axially inserted into a second slot defined at the axial front side of the stator segment.

Optionally, the first slot and/or the second slot extend essentially tangentially with respect to the ring arrangement of the stator segments. Thereby, the connection between the insulation displacement terminal and the connection wire is safer against pulling forces along the connection wires, because the connection wire bends around approximately 90 degrees close to the insulation displacement terminal. The orientation of the respective connection wire end within the installation displacement terminal may be radial, whereas the rest of the connection wire spends across the two interposed stator segments of the other two sets of stator segments.

Optionally, the first coil wire end and a first end of the connection wire extend both radially through the first slot, wherein the first coil wire end is received in a first recess of the first insulation displacement terminal and the first end of the connection wire is received in a second recess of the first insulation displacement terminal, and/or the second coil wire end and a second end of the connection wire extend radially through the second slot, wherein the second coil wire end is received in a first recess of the second insulation displacement terminal and the second end of the connection wire is received in a second recess of the second insulation displacement terminal. Preferably, the first insulation displacement terminal and the second insulation displacement terminal are identical in shape and size. Optionally, the first recess and the second recess of the insulation displacement terminals may be arranged at opposite axial sides of the respective insulation displacement terminal. Thereby, the insulation displacement terminal may be axially inserted into the respective slot for establishing the electrical contact with the respective coil wire end. The respective end of the connection wire is then axially pressed into the other recess of the insulation displacement terminal.

Optionally, the connection wires are not crossing each other. In other words, the stator assembly is preferably devoid of any cross-over connection wires. This facilitates automation a lot.

Optionally, for each stator segment the first coil wire end may be arranged at a radial inner side of the stator segment and the second coil wire may be arranged at a radial outer side of the stator segment. Each connection wire is preferably arranged between the radial inner side of the stator segments and the radial outer side of the stator segments. Preferably, no connection wire extends inward of the radial inner side of the stator segments or outward of the radial outer side of the stator segments. Thereby, the connection wires are neatly arranged in the annular area between the radial inner side of the stator segments and the radial outer side of the stator segments.

Optionally, all stator segments may be essentially identical and differ only by their connection to the connection wires, star point wire, and/or input line phases.

Optionally, each connection wires may span at maximum across an azimuthal angular distance in the range of $$\frac{2}{3} \cdot \frac{360°}{3n} \text{ to } \frac{360°}{3n}.$$

Optionally, the first coil wire end of a coil of a set of stator segments and the second coil wire end of a next-in-series connected coil of said set of stator segments have an azimuthal angular distance to each other in the range of $$\frac{2}{3} \cdot \frac{360°}{3n} \text{ to } \frac{360°}{3n}.$$

In the following, the present disclosure is described in more detail with reference to the accompanying figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
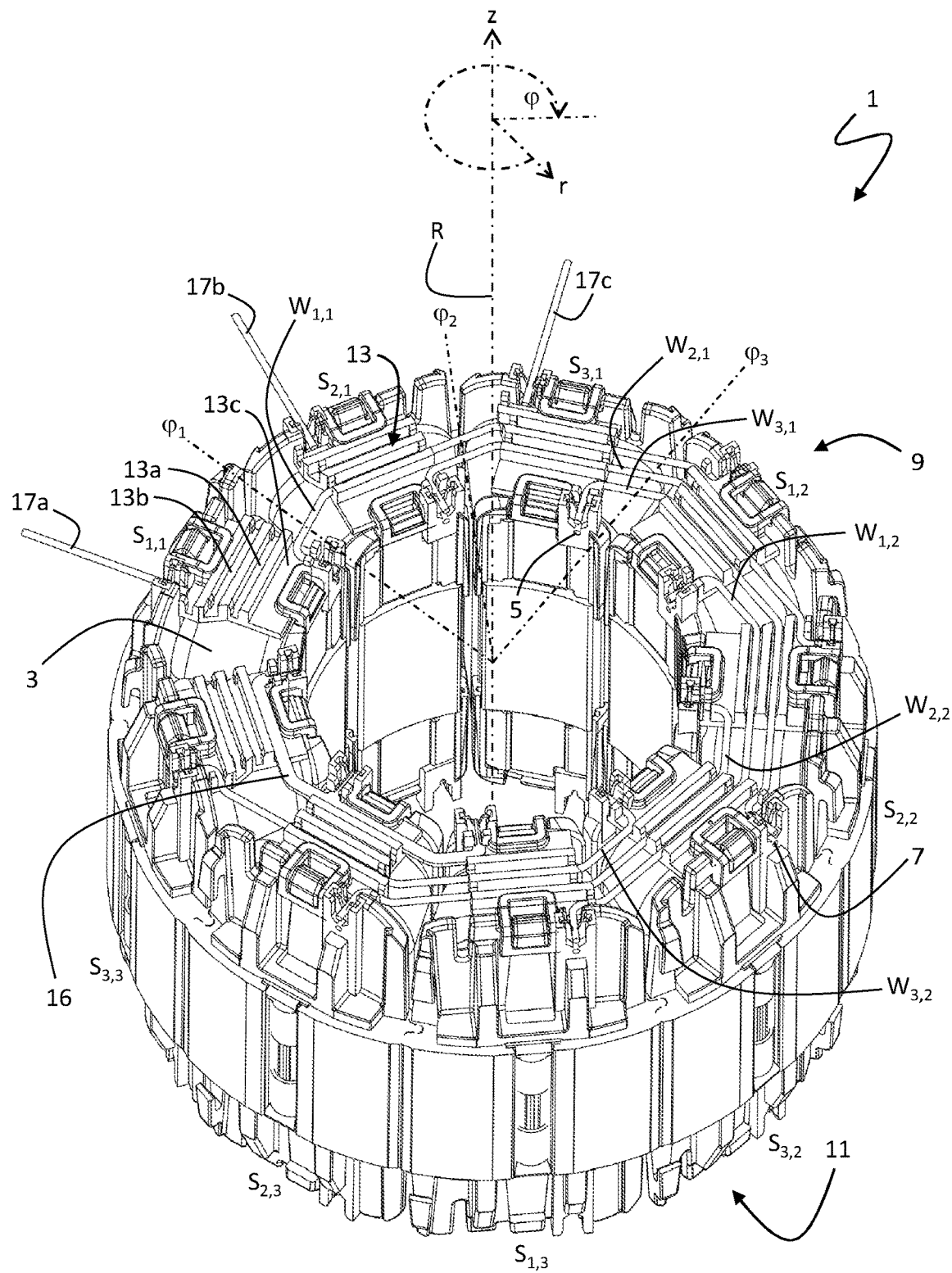
FIG. 1 is a perspective view of an example of an embodiment of a fully assembled three-phase stator assembly according to the present disclosure.

FIG. 1 shows a three-phase stator assembly 1 comprising nine identical stator segments $S_{i,j}$, wherein i shall be the index of the set of a total of three sets, i.e. i={1, 2, 3}. Each set of stator segments comprises n≥2 stator segments $S_{i,j}$ being arranged in an n-fold rotational symmetry about a stator axis R. In the example shown in FIG. 1, each set of stator segments comprises three stator segments, i.e. n=3, wherein j shall be the index of a stator segment within a set of stator segments, i.e. j={1, . . . , n}.

For the figures to be more comprehensible, it is useful to define a cylindrical coordinate system as shown in FIG. 1, wherein an axial position is denoted by z running along the rotor axis R, a position in circumferential direction is denoted by an azimuth angle φ, and a radial distance to the rotor axis R is denoted by r. By arbitrary convention, the positive z-direction may be "forward" or "to the front side", and the negative z-direction may be "backward" or "to the rear side".

Each stator segment $S_{i,j}$ comprises a coil 3 having a first coil wire end 5 and a second coil wire end 7. Both, the first coil wire end 5 and the second coil wire end 7 are arranged at an axial front side 9 of the stator segments $S_{i,j}$. The axial rear side 11 of the stator assembly 1 is facing away in FIG. 1.

The three-phase stator assembly 1 as shown in FIG. 1 further comprises a plurality of 3n−3=6 connection wires $W_{i,k}$, wherein i={1, 2, 3} shall denote the index for the associated set of stator segments $S_{i,j}$, and k={1, . . . , n−1} shall be the index of the connection wire in said set. Each connection wire $W_{i,k}$ connects two coils of a respective set of stator segments $S_{i,j}$ in series. Therefore, each set of stator segments $S_{i,j}$ comprises n−1=2 connection wires $W_{i,1}$ and $W_{i,2}$. Therefore, connection wire $W_{1,1}$ connects the coils 3 of stator segments $S_{1,1}$ and $S_{1,2}$; connection wire $W_{1,2}$ connects the coils 3 of stator segments $S_{1,2}$ and $S_{1,3}$; connection wire $W_{2,1}$ connects the coils 3 of stator segments $S_{2,1}$ and $S_{2,2}$; connection wire $W_{2,2}$ connects the coils 3 of stator segments $S_{2,2}$ and $S_{2,3}$; connection wire $W_{3,1}$ connects the coils 3 of stator segments $S_{3,1}$ and $S_{3,2}$; and connection wire $W_{3,2}$ connects the coils 3 of stator segments $S_{3,2}$ and $S_{3,3}$. Between two in-series-connected stator segments of a set there is a first interposed stator segment and a second interposed stator segments of the other two sets of stator segments arranged in circumferential direction between said two in-series-connected stator segments. This means that the connection wires $W_{i,k}$ must span across at least two interposed stator segments to connect the two coils of a set in series.

For instance, the first interposed stator segment $S_{2,1}$ and the second interposed stator segment $S_{3,1}$ are arranged in circumferential direction between the two connected coils of stator segments $S_{1,1}$ and $S_{1,2}$ of the first (i=1) set of stator segments. Analogously, the interposed first and second stator segments $S_{3,1}$ and $S_{1,2}$ are arranged between the stator segments $S_{2,1}$ and $S_{2,2}$ of the second (i=2) set of stator segments, and so forth. The six connection wires $W_{i,k}$ have the same shape and length. However, in an alternative embodiment, the first connection wire $W_{1,1}$ and the last connection wire $W_{3,2}$ may have more options for a somewhat different shape and/or length. Here, all connection wires $W_{i,k}$ span across the first interposed stator segment (the first stator segment of the other two sets of stator segments being arranged between the two connected coils of stator segments of a respective set of stator segments) at a first radial distance $r_1$ to the stator R. Furthermore, each connection wire $W_{i,k}$ spans across the second interposed stator segment (the second stator segment of the other two sets of stator segments being arranged between the two connected coils of stator segments of said respective set of stator segments) at a second radial distance $r_2$ to the stator axis R. The second radial distance $r_2$ is larger than the first radial distance $r_1$, i.e. $r_2 > r_1$. This means that the connection wires $W_{i,k}$ do not follow a strict circular path coaxial with the stator axis R, but effectively extend radially outward on its path between the two connected coils of stator segments of the respective set of stator segments. For instance, the first connection wire $W_{1,1}$ connects the coils of stator segments $S_{1,1}$ and $S_{1,2}$. The connection wire $W_{1,1}$ crosses the first stator segment $S_{2,1}$ at the first radial distance $r_1$ and the second stator segment $S_{3,1}$ at the second radial distance $r_2$, wherein the second radial distance $r_2$ is larger than the first radial distance $r_1$. Thereby, the connection wire $W_{i,k}$ follow a "spiraling" path of a shape that resembles circular threats of a spider web with linear. In other words, the connection wires $W_{i,k}$ are spiraling radially outward along their path for connecting the coils 3 of the two stator segments $S_{i,j}$ and $S_{i,j+1}$.

Figure 2:
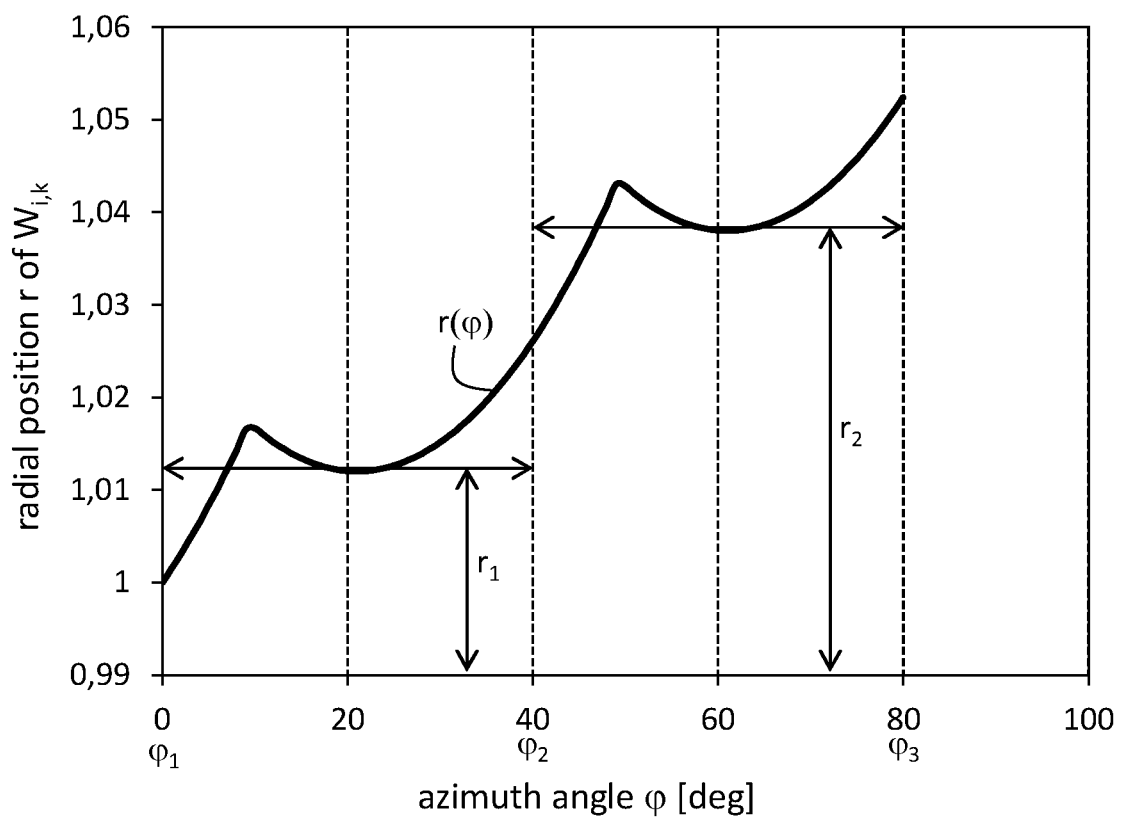
FIG. 2 is a graph of the radial distance of a connection wire to the stator axis as a function of the azimuth angle for a stator assembly as shown in FIG. 1.

FIG. 2 shows a graph of the radial distance r (on an arbitrary relative scale) of the connection wire $W_{i,k}$ to the stator axis R as a function $r(\varphi)$ of the azimuth angle $\varphi$ for a stator assembly 1 as shown in FIG. 1. The azimuth position $\varphi_1$ between the neighbouring stator segments $S_{1,1}$ and $S_{2,1}$ is here defined to be 0°, where $r(\varphi)$ is arbitrarily set to 1. As each stator segment covers an azimuthal angular range of $$\frac{360°}{3n} = 40°,$$

the azimuth position $\varphi_2$ between the neighbouring stator segments $S_{2,1}$ and $S_{3,1}$ is here defined to be 40°, and the azimuth position $\varphi_3$ between the neighbouring stator segments $S_{3,1}$ and $S_{1,2}$ is here defined to be 80°. So, the connection wires $W_{i,k}$ span over an azimuthal angular range of more than 80°. In this range between $\varphi_1$ and $\varphi_3$, the radial distance $r(\varphi)$ of the connection wire $W_{i,k}$ to the stator axis R varies along the length of the connection wire $W_{i,k}$. As can be seen in FIG. 2, the second radial distance $r_2$ in the range between $\varphi_2$ and $\varphi_3$ is always larger than the first radial distance $r_1$ in the range between $\varphi_1$ and $\varphi_2$. There several options for defining the first radial distance $r_1$ and the second radial distance $r_2$, for all of which $r_2 > r_1$ is fulfilled. For instance, $$r_1 = \frac{1}{\varphi_2 - \varphi_1} \int_{\varphi_1}^{\varphi_2} r(\varphi) d\varphi \text{ and } r_2 = \frac{1}{\varphi_3 - \varphi_2} \int_{\varphi_2}^{\varphi_3} r(\varphi) d\varphi,$$

i.e. average radial distances in the respective azimuthal range may be compared. Alternatively, a median radial distance value in the respective azimuthal range may be compared. Alternatively, the radial distance values at the central azimuth positions 20° and 60° may be compared. It should be noted that the radial distance may continuously increase along the length of the connection wire $W_{i,k}$, but it does not need to. As can be seen in FIG. 2, the radial distance may even shortly decrease, e.g. in the ranges 10°-20° and 50°-60°. This is due to the fact that the connection wires $W_{i,k}$ here have three linear sections in the range between $\varphi_1$ and $\varphi_3$, between which sections there is are two bends or kinks at azimuth positions 10° and 50°. These bends or kinks are visible in FIG. 2 as spikes in the function $r(\varphi)$.

Back to FIG. 1, each stator segment $S_{i,j}$ is equipped with a wire guide structure 13 arranged at the axial front side 9 of the respective stator segment $S_{i,j}$. All nine wire guide structures 13 are arranged in the same plane perpendicular to the rotor axis R. All nine wire guide structures 13 may be considered together as a wire guide element 15. The wire guide element 15 may be an annular integral structure, wherein the wire guide structures 13 are connected to each other as shown in FIG. 11. In the embodiment as shown in FIGS. 1 to 10, however, the wire guide structures 13 are separate from each other and have a distance to each other in circumferential direction. All wire guide structures 13 are identical to each other. Each wire guide structure 13 is fixed to the axial front side 9 of the respective stator segment $S_{i,j}$ by a positive fit, e.g. a clip connection or snap-in connection.

Each wire guide structure 13 defines a first essentially tangential path 13a for guiding a connection wire $W_{i,k}$ across the first interposed stator segment and an essentially tangential second path 13b for guiding another connection wire $W_{i,k}$ across the second interposed stator segment $S_{i,j}$. The first path 13a is positioned radially more inward than the second path 13b. The wire guide structure 13 further defines an essentially tangential third path 13c for guiding a star point wire 16. The third path 13c is arranged radially more inward than the first path 13a. The star point wire 16 connects the first coil wire ends 5 of the coils 3 of the last (j=n) stator segments $S_{1,3}$, $S_{2,3}$ and $S_{3,3}$ with each other. The star point wire 16 may have a larger diameter than the connection wires $W_{i,k}$. The paths 13a-c are here all linear, but may be at least partially non-linear in other non-shown embodiments.

The second coil wire ends 7 of the first (j=1) stator segments $S_{1,1}$, $S_{2,1}$ and $S_{3,1}$ of each set are each connected to one phase 17a, b, c of a three-phase power input line comprising the three phases 17a, b, c.

Figure 3:
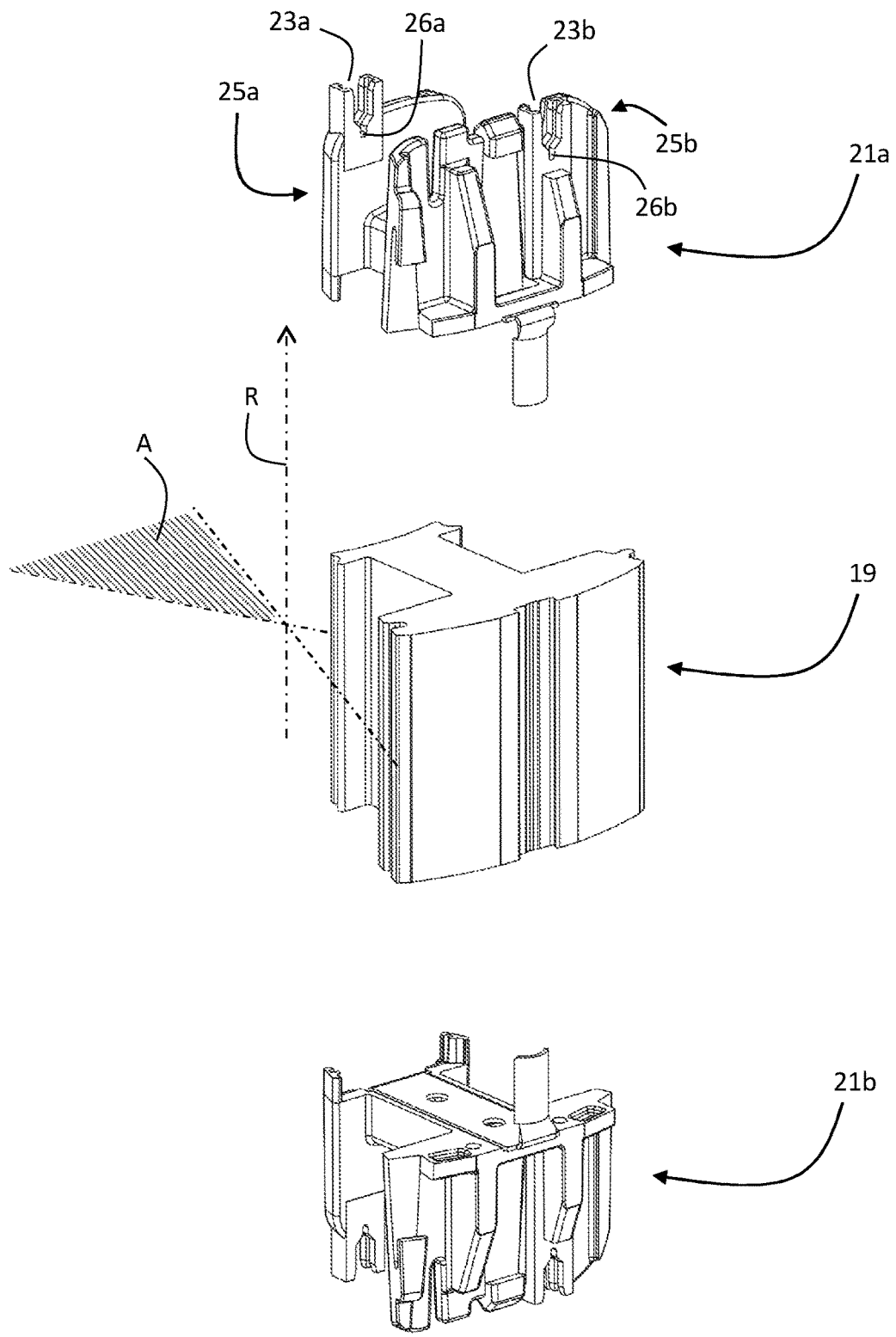
FIG. 3 is an exploded perspective view of the coil-forming parts of a stator segment according to FIG. 1.

FIGS. 3 to 7 show a stepwise assembly of the stator segment $S_{i,j}$. FIG. 3 shows an exploded view of the coil-forming elements of the stator segment $S_{i,j}$. The coil-forming elements comprise an axially central core 19 of high magnetic permeability, e.g. iron, having an H-shaped cross section. The coil-forming elements further comprise an axial front part 21a and an axial rear part 21b attached to opposite axial sides of the core 19. The front part 21a and the rear part 21b may be composed of electrically insulating material, i.e. a plastic, composite or ceramic material. The front part 21a and the rear part 21b may be shaped mirror-symmetrically to each other with reference to an axially central symmetry plane A extending perpendicular to the rotor axis R. The front part 21a comprises a first slot 23a and a second slot 23b, which are both axially open to the forward. The first slot 23a and the second slot 23b extend tangentially with respect to the ring arrangement of the stator segments $S_{i,j}$. The first slot 23a and the second slot 23b are angularly offset to each other in terms of azimuth angle μ, so that the first slot 23a is positioned at a first lateral side 25a of the stator segment $S_{i,j}$ and the second slot 23b is located at a second lateral side 25b of the stator segment $S_{i,j}$.

The first slot 23a and the second slot 23b comprise V-shaped cut-outs into which the first coil wire end 5 and the second coil wire end 7, respectively can be placed. The V-shaped cut-outs in the first slot 23a and the second slot 23b form radially extending grooves 26a,b, into which the first coil wire end 5 and the second coil wire end 7, respectively, can be inserted.

Figure 4:
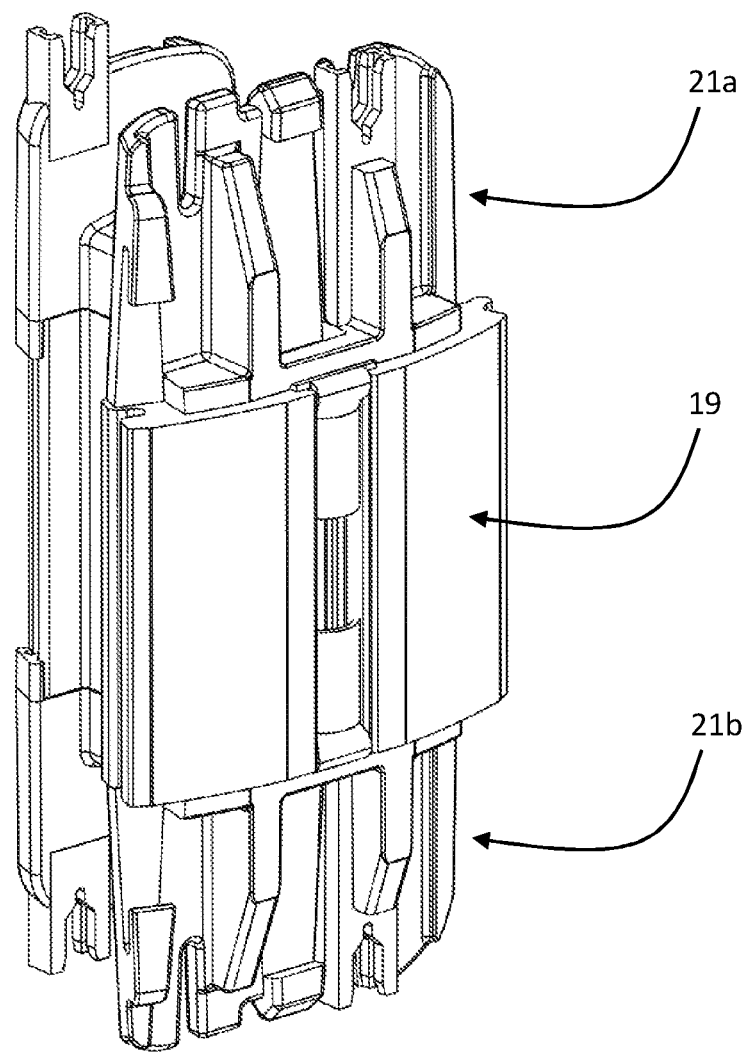
FIG. 4 is a perspective view of the coil-forming parts of a stator segment according to FIG. 3.
Figure 5:
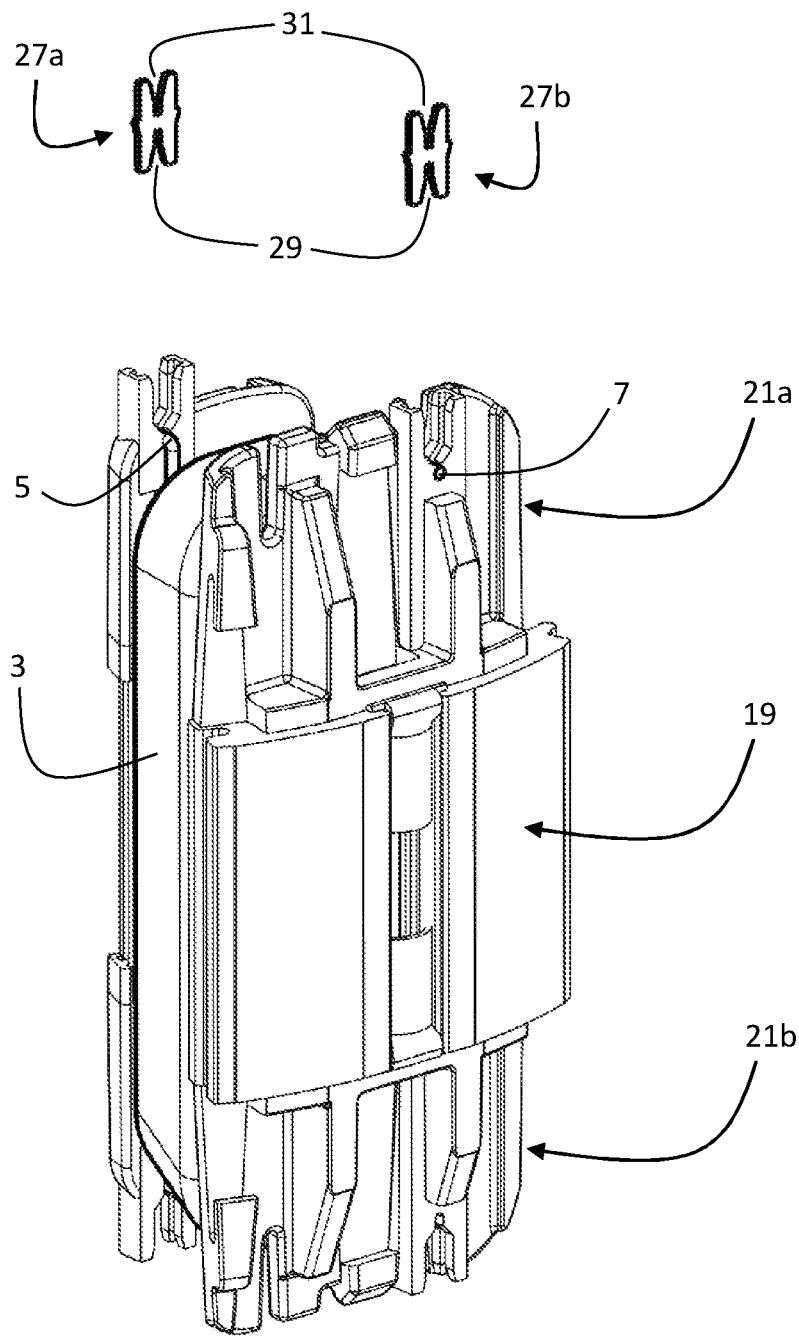
FIG. 5 is a perspective view of the coil-forming parts of a stator segment according to FIG. 4 after the coil is wound and before the first and second insulation displacement terminals are inserted.
Figure 6:
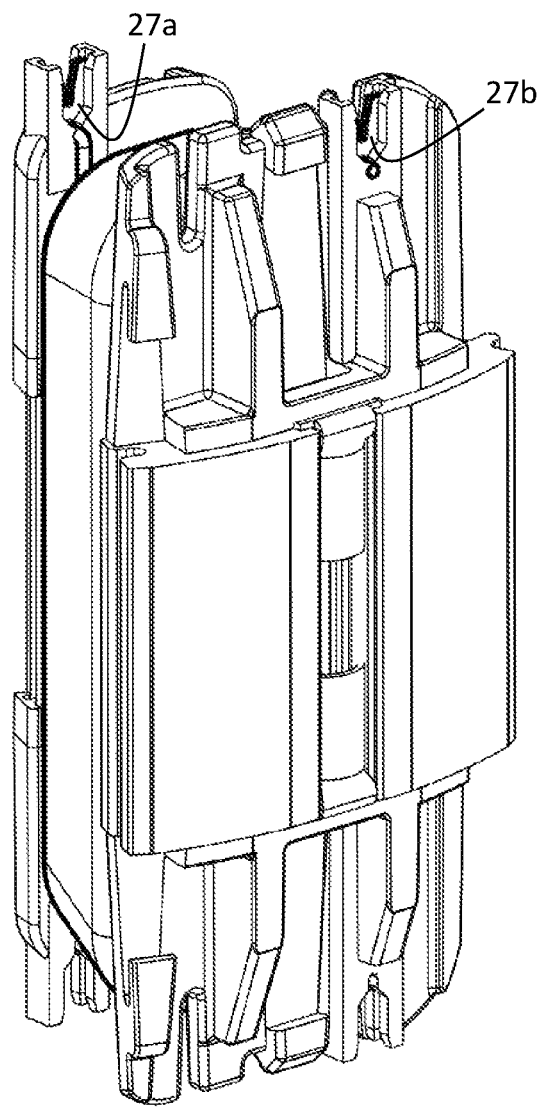
FIG. 6 is a perspective view of a stator segment according to FIG. 5 after the first and second insulation displacement terminals have been inserted.

FIG. 4 shows the paths of FIG. 2 assembled together. The coil forming paths as shown in FIG. 3 are ready to receive a coil wire. In FIG. 5, a coil wire is wound around the coil-forming elements to form the coil 3. The first coil wire end 5 is inserted into the groove 26a of the first slot 23a so that it extends radially inward to cross the first slot 23a. Analogously, the second coil wire end 7 is inserted into the groove 26b of the second slot 23b, in which the second coil wire end 7 extends radially outward across the second slot 23b. FIG. 5 further shows a first insulation displacement terminal 27a and a second insulation displacement terminal 27b before being axially inserted into the first slot 23a and the second slot 23b, respectively. The insulation displacement terminals 27a, b are identical to each other and comprise a V-shaped first recess 29 facing (backwards) towards the slots 23a,b. The insulation displacement terminals 27a,b have a shape that is mirror-symmetric with respect to a central symmetry plane extending perpendicular to the rotor axis R. Thus, the insulation displacement terminals 27a,b comprise each a V-shaped second recess 31 facing axially away from the slots 23a, b. As shown in FIG. 6, the insulation displacement terminals 27a,b are axially pressed downward into the slots 23a,b, so that the first recess 29 receives the respective coil wire end 5, 7. Thereby, the coil wire ends 5, 7 are fixed into position by the insulation displacement terminals 27a,b. Furthermore, the insulation displacement terminals 27a,b cut into an insulation coating of the coil wire ends 5, 7, so that there is an electric contact between the insulation displacement terminal 27a, b and the respective coil wire end 5, 7. The insulation displacement terminals 27a,b are preferably metallic. FIG. 6 shows the situation after the insulation displacement terminals 27a,b have been inserted into the slots 25a, b.

Figure 7:
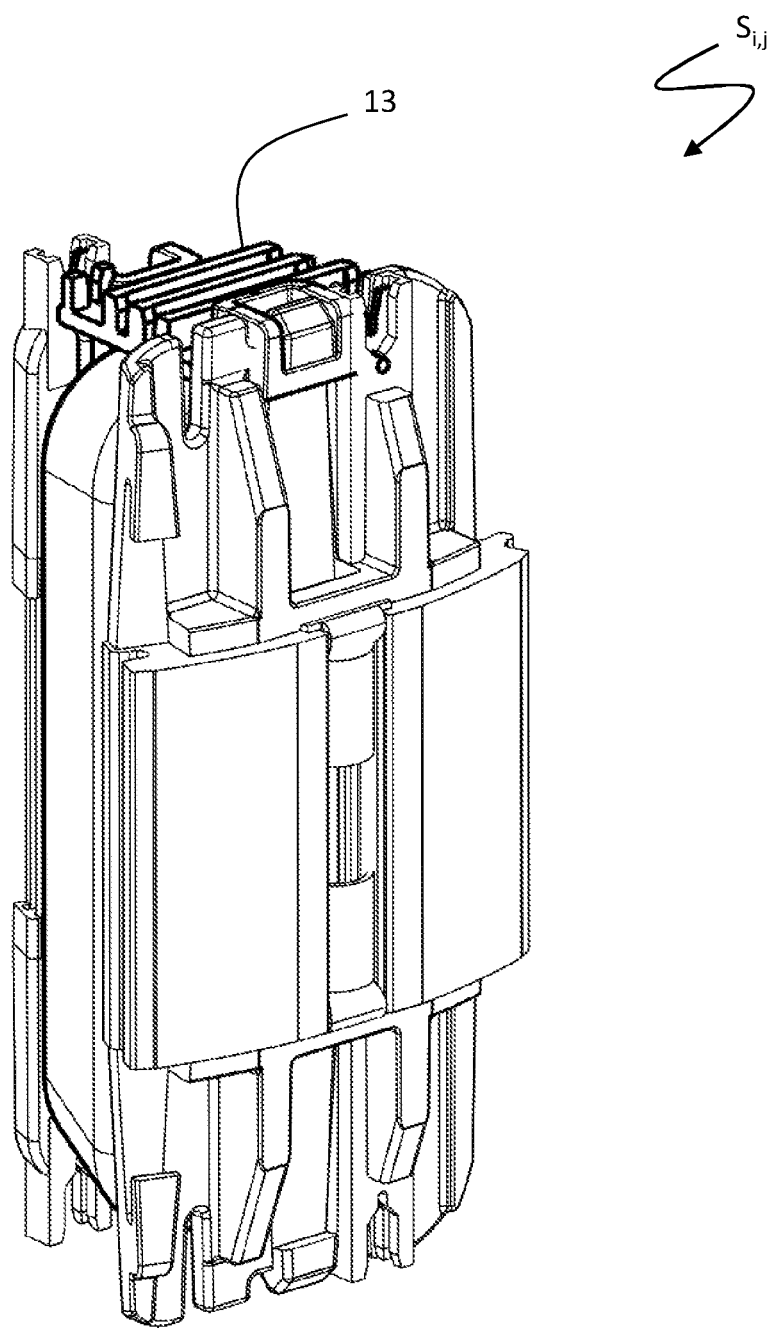
FIG. 7 is a perspective view of a stator segment according to FIG. 6 after mounting of a wire guide structure to the axial front side of the stator segment.

FIG. 7 shows the fully assembled stator segment $S_{i,j}$ with the wire guide structure 13 being arranged at the axial front side 9 of the stator segment $S_{i,j}$. The wire guide structure 13 essentially extends in a plane perpendicular to the rotors axis R and is clicked into a positive fit with the front part 21a of the stator segment $S_{i,j}$.

Figure 8:
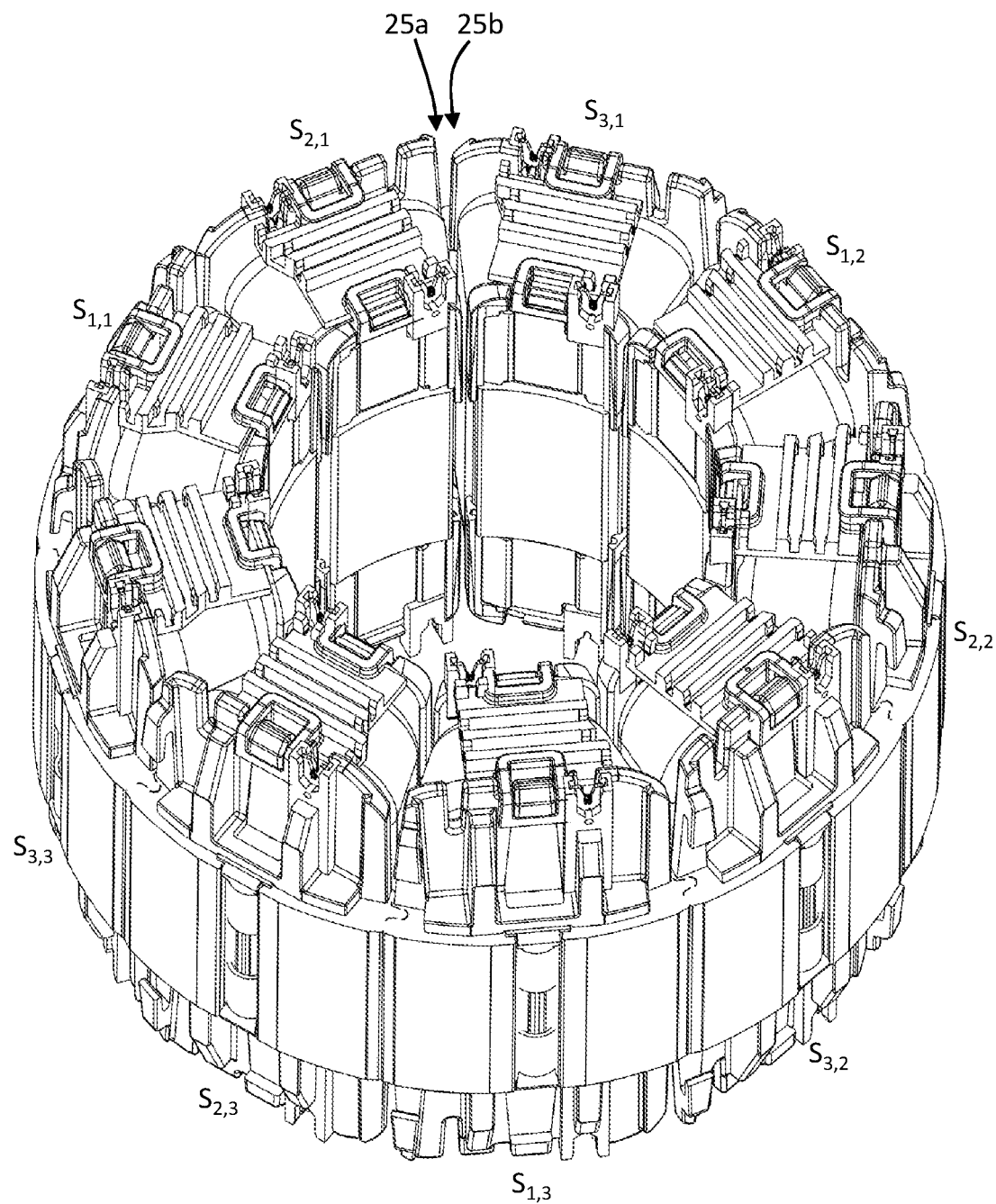
FIG. 8 is a perspective view of a ring arrangement of nine stator segments according to FIG. 7.

FIG. 8 shows the situation after nine identical stator segments $S_{i,j}$ as shown in FIG. 7 are arranged in a ring arrangement to form the stator assembly 1. The stator segments $S_{i,j}$ are attached to each other at their lateral sides 25a,b, wherein the first lateral side 25a of a stator segment SL; is connected by a positive fit with the second lateral side 25b of the neighbouring stator segment $S_{i,j}$. As can be seen in FIG. 8, the wire guide structures 13 have a distance to each other in circumferential direction, i.e. there is azimuthal angular distance of approximately 20° between them. This is, because they are narrower than the stator segments $S_{i,j}$. In other words, the stator segments $S_{i,j}$ span across an azimuthal angular distance of $$\frac{360°}{3n} = 40°$$

with n=9, whereas the wire guide structures 13 span across less than $$\frac{360°}{3n},$$

e.g. across $$\frac{360°}{3n} = 20°$$

about the azimuthal centre of the respective stator segment $S_{i,j}$.

Figure 9:
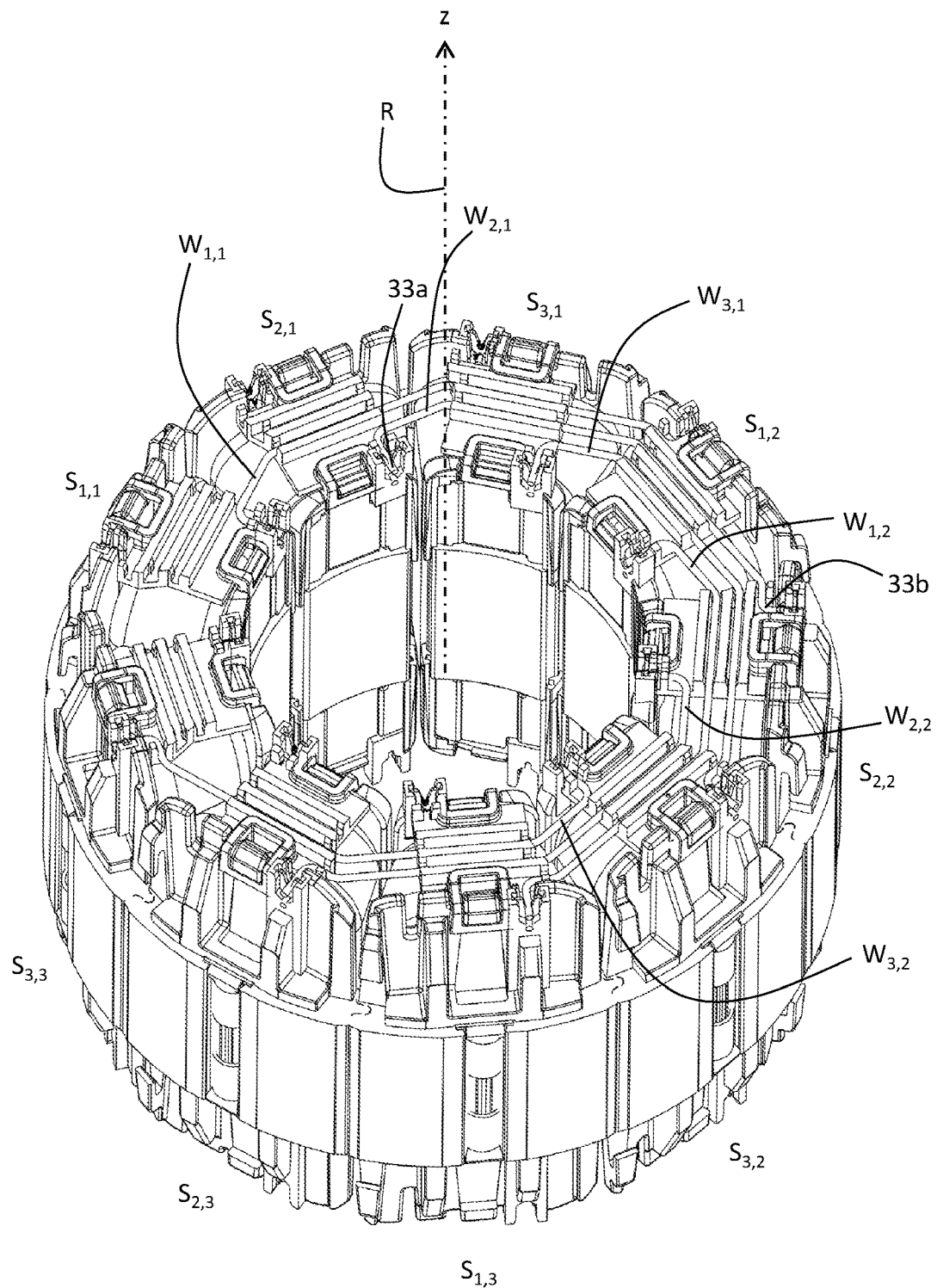
FIG. 9 is a perspective view of the ring arrangement according to FIG. 8 after installation of the connection wires.

FIG. 9 shows the situation after assembly of the connection wires $W_{i,k}$. The six connection wires $W_{i,k}$ are identical in shape and length and can be placed by a machine simultaneously or one after another into position by a purely axial movement. For instance, the machine may simply push the connection wire $W_{i,k}$ axially "downward" in FIG. 9, i.e. backward into negative z-direction along the stator axis R. The machine does not even have to change its angular position, because the ring arrangement of stator segments $S_{i,j}$ may be rotated by $$\frac{360°}{3n} = 40°$$

to receive the next connection wire from the machine at the exactly same position. A first connection wire end 33a is thereby inserted into the second recess 31 of the first insulation displacement terminal 27a in the first slot 23a in parallel to the first coil wire end 5. Analogously, a second connection wire end 33b is pressed into the second recess 31 of the second insulation displacement terminal 27b in the second slot 23b in parallel to the second coil wire end 7. Thereby, the insulation displacement terminals 27a, b cut into an insulation coating of the connection wire $W_{i,k}$ at the first connection wire end 33a and the second connection wire end 33b, respectively, in order to establish an electrical contact with the respective coil wire end 5, 7.

Figure 10:
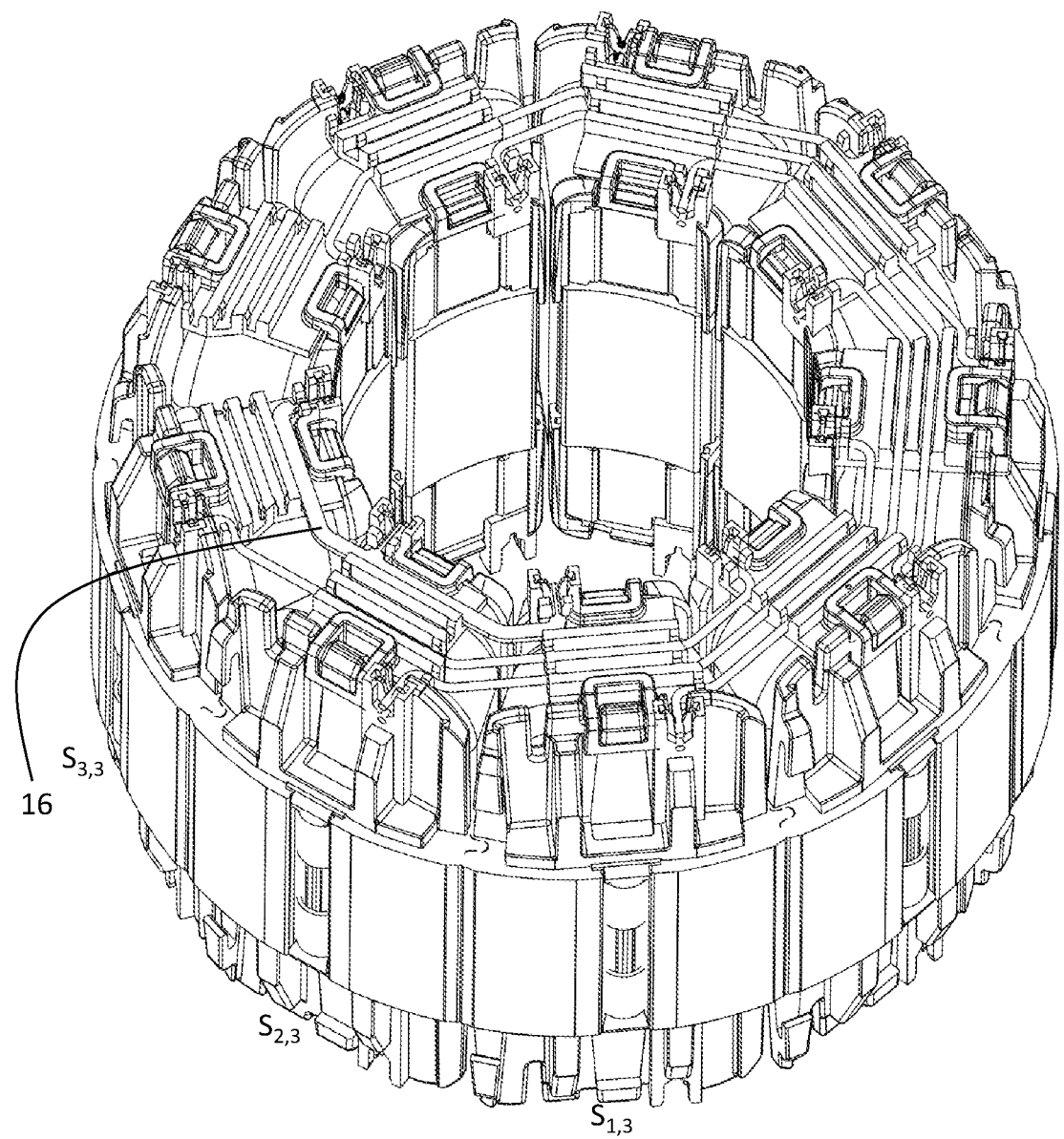
FIG. 10 is a perspective view of the ring arrangement according to FIG. 9 after insulation of the star point wire.
Figure 11:
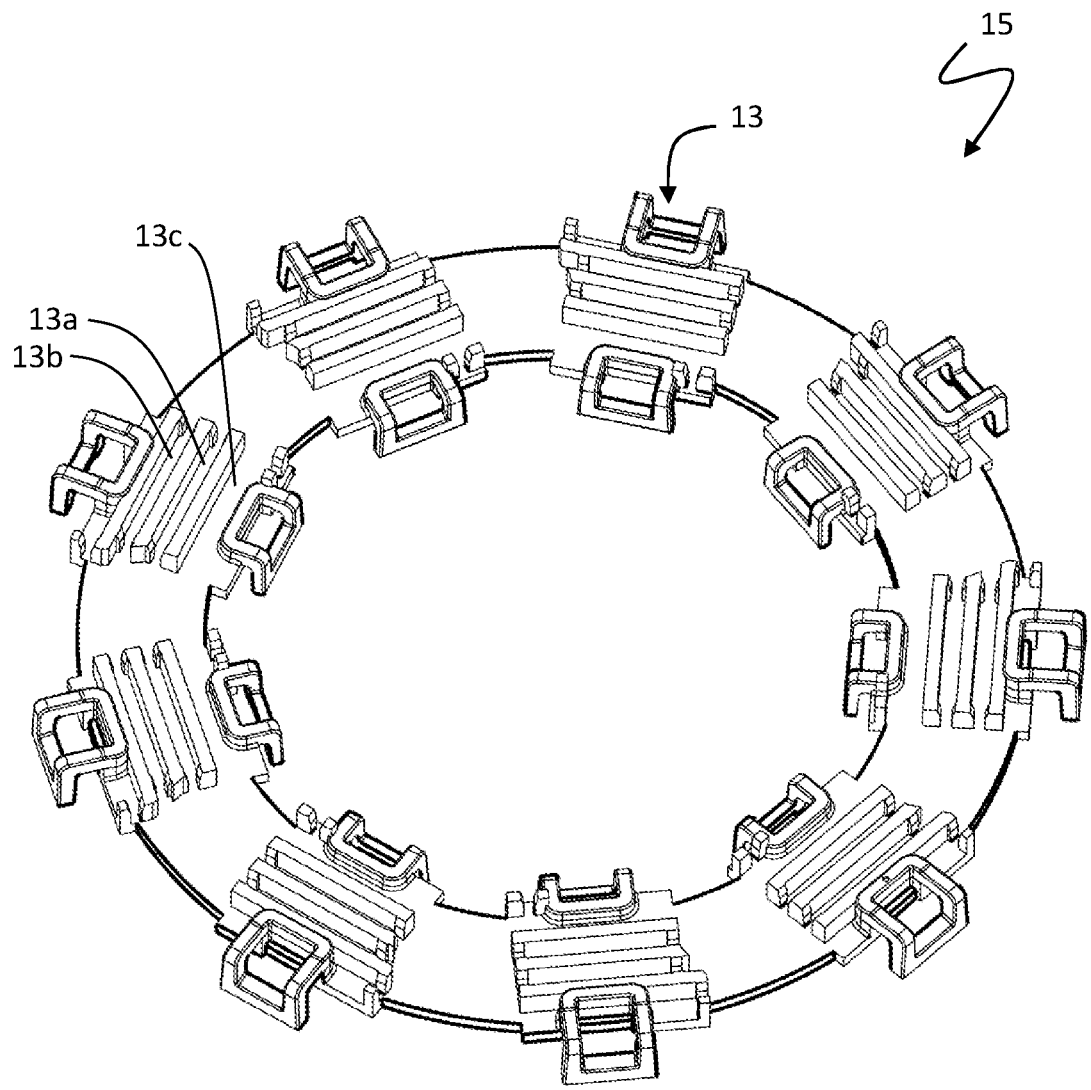
FIG. 11 is a perspective view of an alternative embodiment of an integral annular-shaped wire guide element comprising nine separate and identical wire guide structures.

FIG. 10 shows the situation after assembly of the star point wire 16 extending along the third radially most inward path 13c of the wire guide structure 13 of stator segment $S_{2,n}$. The star point wire 16 is shorter than the connection wires $W_{i,k}$, but has a larger diameter. It connects the coils 3 of the last (j=n) stator segments $S_{i,n}$ of the three sets with each other at their first coil wire ends 5. Therefore, the star point wire 16 comprises three star point ends being axially pressed into the second recess 31 of the first insulation displacement terminal 27a in the first slots 23a of the stator segments $S_{i,n}$ of the three sets of stator segments. Finally, to arrive at the fully assembled stator assembly 1 as shown in FIG. 1, the three phases 17a, b, c of the three-phase power input line 17 are pressed axially into the second recess 31 of the second insulation displacement terminal 27b in the second slot 23b of the respective first (j=1) stator segment $S_{i,1}$ of the three sets of stator segments.

An alternative embodiment to the nine separate and identical wire guide structures 13 is shown in FIG. 11. FIG. 11 shows a wire guide element 15 defining a plurality of wire paths 13a,b,c being arranged in a 3n-fold rotational symmetry about the stator axis R. The wire guide element 15 is essentially an annular integral structure connecting the wire guide structures 13 into a single structure. Instead of mounting separate wire guide structures 13 to the stator segments $S_{i,j}$ as shown in FIG. 7, the wire guide element 15 according to FIG. 11 is mounted to the full ring arrangement of stator segments $S_{i,j}$.

While specific embodiments of the invention have been shown and described in detail to illustrate the application of the principles of the invention, it will be understood that the invention may be embodied otherwise without departing from such principles.

LIST OF REFERENCE CHARACTERS 1 stator assembly
3 coil
6 first coil wire end
7 second coil wire end
9 axial front side
11 axial rear side
13 wire guide structure
15 wire guide element
15a, b, c wire paths
16 star point wire
17a, b, c phases of the three-phase power input line
19 core
21a front part 21b rear part
23a first slot
23b second slot
25a first lateral side
25b second lateral side
27a first insulation displacement terminal
27b second insulation displacement terminal
29 first recess
31 second recess
33a first connection wire end
33b second connection wire end
i index for set of stator segments
j index for stator segment within a set of stator segments
k index for connection wire for a set of stator segments
$S_{i,j}$ stator segment
$W_{i,k}$ connection wire
R stator axis
φ azimuth angle
A symmetry plane
$r_1$ first radial distance
$r_2$ second radial distance

The invention claimed is:

1. A three-phase stator assembly of an electric pump drive motor, the stator assembly comprising:
    three sets of stator segments, wherein the stator segments are configured as a ring arrangement about an axially extending stator axis, wherein each set of stator segments comprises n≥2 stator segments with an n-fold rotational symmetry about the stator axis, wherein each stator segment comprises coil-forming elements on which a coil wire is wound, wherein the coil wire has a first coil wire end at a radial inner side of the stator segment and a second coil wire end at a radial outer side of the stator segment;
    a wire guide element being mounted to an axial front side of the stator segments that have the coil wire wound on their coil-forming elements;
    a star point wire being guided by the wire guide element and connecting the first coil wire ends of the coil wires of the $(j=n)^{th}$ stator segments of the three sets of stator segments with each other; and
    a plurality of 3n−3 connection wires that are arranged at the axial front side of the stator segments, wherein the connection wires, guided by the wire guide element, are not crossing each other, wherein each connection wire connects two coil wires of a respective set of stator segments in series, wherein a first interposed stator segment and a second interposed stator segment of two other sets of the stator segments are arranged in circumferential direction between the two connected coil wires of said respective set of stator segments,
    wherein at least 3n−5 of the connection wires span across the first interposed stator segment at a first radial distance to the stator axis and across the second interposed stator segment at a second radial distance to the stator axis, wherein the second radial distance is larger than the first radial distance,
    wherein each stator segment further comprises a first insulation displacement terminal for connecting the respective connection wire with the first coil wire end and a second insulation displacement terminal for connecting the respective connection wire with the second coil wire end.

2. The three-phase stator assembly according to claim 1, wherein the at least 3n−5 of the connection wires have a same shape and length.

3. The three-phase stator assembly according to claim 1, wherein all connection wires extend over a full length thereof essentially in a common plane perpendicular to the stator axis.

4. The three-phase stator assembly according to claim 1, further comprising a three-phase power input line with three phase, wherein each phase is connected to the second coil wire end of the coil wire of the $(j=1)^{st}$ stator segment of a respective set of the stator segments.

5. The three-phase stator assembly according to claim 1, wherein the wire guide element defines a plurality of wire paths, wherein the wire paths are arranged in a 3n-fold rotational symmetry about the stator axis.

6. The three-phase stator assembly according to claim 5, wherein the wire guide element is fixed to the axial front side of the stator segments by a positive fit.

7. The three-phase stator assembly according to claim 5, wherein the wire guide element is arranged radially between the first coil wire ends and the second coil wire ends of the coil wire of the respective stator segment.

8. The three-phase stator assembly according to claim 1, wherein the wire guide element is comprised of a plurality of 3n separate and identical wire guide structures, wherein each wire guide structure is arranged at the axial front side of a respective stator segment.

9. The three-phase stator assembly according to claim 8, wherein the wire guide structures are spaced a distance to each other in circumferential direction.

10. The three-phase stator assembly according to claim 1, wherein the first coil wire end of the coil wire of each of the stator segments is arranged at a first lateral side of the respective stator segment and the second coil wire end of the coil wire of each stator segment is arranged at a second lateral side of the respective stator segment.

11. The three-phase stator assembly according to claim 1, wherein the first insulation displacement terminal is axially inserted into a first slot defined at the axial front side of the stator segment and the second insulation displacement terminal is axially inserted into a second slot defined at the axial front side of the stator segment.

12. The three-phase stator assembly according to claim 11, wherein the first slot or the second slot or both the first slot and the second slot extend essentially tangentially with respect to the ring arrangement of the stator segments.

13. The three-phase stator assembly according to claim 11, wherein:
    the first coil wire end and a first connection wire end extend radially across the first slot, wherein the first coil wire end is received in a first recess of the first insulation displacement terminal and the first connection wire end is received in a second recess of the first insulation displacement terminal; or
    the second coil wire end and a second connection wire end extend radially across the second slot, wherein the second coil wire end is received in a first recess of the second insulation displacement terminal and the second connection wire end is received in a second recess of the second insulation displacement terminal; or
    the first coil wire end and a first connection wire end extend radially across the first slot, wherein the first coil wire end is received in a first recess of the first insulation displacement terminal and the first connection wire end is received in a second recess of the first insulation displacement terminal and the second coil wire end and a second connection wire end extend radially across the second slot, wherein the second coil wire end is received in a first recess of the second insulation displacement terminal and the second connection wire end is received in a second recess of the second insulation displacement terminal.

14. The three-phase stator assembly according claim 13, wherein the first recess and the second recess of the first insulation displacement terminal or second insulation displacement terminal or both the first insulation displacement terminal and the second insulation displacement terminal are arranged at opposite axial sides of the respective insulation displacement terminal.

15. The three-phase stator assembly according to claim 1, wherein all stator segments are essentially identical and differ only by one or more of a connection to the connection wires, input phases or a star point wire.

16. The three-phase stator assembly according to claim 1, wherein each connection wire spans at maximum across an azimuthal angular distance great than 2*360° /3n.

17. The three-phase stator assembly according to claim 1, wherein the first coil wire end of a coil wire of a set of stator segments and the second coil wire end of a next-in-series connected coil wire of said set of stator segments have an azimuthal angular distance to each other greater than 2*360° /3n.

* * * * *